(12) United States Patent
Gochi Garcia

(10) Patent No.: US 8,966,123 B2
(45) Date of Patent: Feb. 24, 2015

(54) UNOBTRUSIVE CONTENT COMPRESSION IN A TELECOMMUNICATIONS NETWORK

(75) Inventor: Ibon Gochi Garcia, Algorta Vizcaya (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/239,845

(22) PCT Filed: Nov. 3, 2011

(86) PCT No.: PCT/EP2011/069307
§ 371 (c)(1),
(2), (4) Date: Feb. 20, 2014

(87) PCT Pub. No.: WO2013/064185
PCT Pub. Date: May 10, 2013

(65) Prior Publication Data
US 2014/0211813 A1   Jul. 31, 2014

(51) Int. Cl.
*G06F 15/16* (2006.01)
*H04W 28/06* (2009.01)
*H04L 29/06* (2006.01)
*H04L 29/08* (2006.01)

(52) U.S. Cl.
CPC ............. *H04W 28/065* (2013.01); *H04L 69/04* (2013.01); *H04L 67/2828* (2013.01); *H04L 67/02* (2013.01)
USPC .......................................... 709/247; 370/389

(58) Field of Classification Search
USPC .......... 370/351, 389, 392, 394, 401; 709/247, 709/219
See application file for complete search history.

(56) References Cited

U.S. PATENT DOCUMENTS

| | | | |
|---|---|---|---|
| 7,359,974 B1 * | 4/2008 | Quinn et al. | ................. 709/228 |
| 2002/0056010 A1 | 5/2002 | Lincoln et al. | |
| 2004/0205249 A1 | 10/2004 | Berry | |
| 2008/0034119 A1 | 2/2008 | Verzunov et al. | |

FOREIGN PATENT DOCUMENTS

| | | |
|---|---|---|
| WO | 0210929 A1 | 2/2002 |
| WO | 2004084459 A2 | 9/2004 |

OTHER PUBLICATIONS

International Search Report and Written Opinion dated Sep. 6, 2012 for International Application No. PCT/EP2011/069307, International Filing Date: Nov. 3, 2011 consisting of 14-pages.
3GPP TS 3rd Generation Partnership Project; 3GPP TS 23.203 V11.2.0 (Jun. 2011) Technical Specification Group Services and System Aspects; Policy and charging control architecture (Release 11) Jun. 4, 2011 consisting of 142-pages.

(Continued)

*Primary Examiner* — Curtis A Alia
(74) *Attorney, Agent, or Firm* — Christopher & Weisberg, P.A.

(57) ABSTRACT

A telecommunications network policy enforcing point operable to route IP datagrams in a two-way communication between a first endpoint in a telecommunications network and a second endpoint in the telecommunications network and operable to compress, in accordance with a data compression policy, IP datagrams of a response transmitted by the second endpoint to the first endpoint. The response is of a layer 7 protocol that supports compression, a layer level being an Open Systems Interconnection, OSI, layer in an OSI Reference Model, and each IP datagram of the response comprises a sequence of bytes of data and a header defining a sequence number of the first byte of data in the IP datagram.

20 Claims, 8 Drawing Sheets

(56) References Cited

OTHER PUBLICATIONS

Cooper et al., Network Working Group, RFC 3143, Category: Informational, "Known HTTP Proxy/Caching Problems" Jun. 2011 consisting of 32-pages.

Deutsch et al., Network Working Group, RFC 1950, Category: Informational, "ZLIB Compressed Data Format Specification version 3.3" May 1996 consisting of 11-pages.

Fielding et al., Network Working Group, RFC 2616, Obsoletes: 2068, Category: Standards Track, "Hypertext Transfer Protocol—HTTP/1.1" Jun. 1999 consisting of 176-pages.

* cited by examiner

UNOBTRUSIVE CONTENT COMPRESSION IN A TELECOMMUNICATIONS NETWORK

TECHNICAL FIELD

The present invention relates to the compression of IF datagrams routed in a two-way communication between endpoints in a telecommunications network, the IF datagrams conveying a response of a Layer 7 protocol that supports compression (the Layer level being understood in the sense of the Open Systems Interconnection (OSI) Reference Model), such as HTTP/1.1, for example.

BACKGROUND

The rising popularity of mobile data plans and mobile broadband (MBB) in recent years, combined with the availability of cheap terminals (also widely referred to as "User Equipments" or "UEs") with computer-like capabilities, such as smart phones, have increased the demands on telecommunications networks, particularly in terms of bandwidth capacity and quality of service QoS). Network operators of telecom networks providing mobile access and mobile equipment manufacturers are among those striving to find solutions to meet these increasing demands.

FIG. 1 is a simplified illustration of a telecommunications network comprising a mobile data network 10 which can connect a UE (e.g. a smart phone) to the Internet 30 via a proxy server 40, such that the UE 20 is able to download content and otherwise communicate with a web server 50 connected to the Internet 30.

To improve bandwidth availability in a telecommunications network such as the one shown in FIG. 1, the traffic crossing the network can be reduced by employing a communication protocol that supports compression. However, the decision to compress traffic is taken by the endpoints involved in the communication (for example, the UE 20 acting as a client and the web server 50 acting as a server in a client-server architecture, or the peers in a peer-to-peer architecture), with no room for the telecommunications data network mediating in the communication to impact on the decision.

It would be desirable for a telecom network that provides data communications between endpoints to be able to force compression at the Application Level (i.e. Layer 7, as understood in the sense of the OSI Reference Model), i.e. without having to compress the complete data stream/content (or, in other words, without tunnelling), under the following circumstances:

For payload traffic (contents) of protocols that have built-in support for compression; and For clients and servers (or communicating peers, as the case may be) that, while supporting the option of compressing contents, have decided not to do so.

Following these guidelines, protocols which are susceptible to forceful compression can be considered. The "Hypertext Transfer Protocol", HTTP, is perhaps the best known case and will therefore be discussed in the following. Other application layer protocols (such as SOAP or XML-RPC) or web-based services (such as "Dropbox" or "Twitter"), which use HTTP as a basis, may also be considered as candidates in a scheme for forcing compression.

According to recent mobile traffic reports, HTTP-based traffic accounts for a substantial proportion of the data transmitted in mobile data networks. HTTP is the Application Level protocol used as the foundation for data communications in the World Wide Web. HTTP functions as a request-response protocol (using a client-server model), in accordance with which an HTTP client (typically a web browser) in the UE 20 (or in any other device that can connect to the mobile network using the UE 20) can contact an HTTP server (e.g. web server 50), and request some of the information which the HTTP server 50 stores, or alternatively sends the HTTP server 50 information for later processing. Requests for information from the web server 50 typically make use of an HTTP GET method, while uploads to the web server 50 may use the HTTP POST or GET methods, among others.

HTTP supports content compression, understood as the capability of communicating endpoints to send and receive compressed content to optimize the use of the underlying bandwidth resources and later present that information to upper layers in the Internet Protocol Suite in an uncompressed (and equal to the original) format. More specifically, protocols such as HTTP that support content compression do so by defining the control signalling required to allow an endpoint to indicate its willingness (or a preference) to receive compressed content of a specified compression format from another endpoint, as well as that required to allow an endpoint to provide an indication of whether content it sends to another endpoint is compressed and, if so, the compression format used.

Thus, the GE 20 functioning as an HTTP client that implements the current version of HTTP, namely HTTP/1.1, and is willing to accept compressed content in the form of IP datagrams containing compressed, encapsulated data, includes in the "Accept-Encoding" header in the Request sent to the web server 50 a list naming the compression schemas it supports. For example, the following "Accept-Encoding" header of an HTTP Request sent by an HTTP client shows that the client supports both "grip" and "deflate" schemas:

Accept-Encoding: grip, deflate

Quality Values (so-called "qvalues") can be used to express a preference. For example, in the following example, the client is expressing a preference for "grip" over "deflate":

Accept-Encoding: grip; q=1.0, deflate; q=0.5, *; q=0

If the web server 50 (or any HTTP entity acting as server and receiving the requests) supports any of the compression schemas proposed by the HTTP client 20, it may decide to compress the content in the reply according to that schema. The web server 50 is by no means obligated to perform any compression on the content, and would do so based on its internal configuration, internal capabilities, network or processing load and/or other factors.

If the web server 50 chooses to compress the content, it will include in a "Content-Encoding" header of its Response the schema used. For instance, the following example can be used to inform the HTTP client 20 that the content has been compressed using the "gzip" schema:

Content-Encoding: gzip

HTTP content compression works well in reducing the bandwidth usage of HTTP when the client 20 supports compression and the server 50 chooses to send compressed content. In this respect, most modern web browsers, whether implemented in traditional personal computers or in modern mobile terminals, support HTTP content compression. Further details of HTTP content compression are provided in RFC 2616 "Hypertext Transfer Protocol HTTP/1.1", June 1999).

In the example of FIG. 1, it is up to the HTTP client 20 to announce the compression schemas supported, and up to the HTTP server 50 to send the content either compressed or uncompressed. As noted above, the decision taken by the HTTP server 50 on whether or not to compress data it sends to the HTTP client 20 may depend on the server's configuration or other internal factors (e.g. processor load, since compressing data contents consumes processing resources) or perhaps external factors (e.g. local network segment). Thus, in general, an indication that compressed data content may be accepted by the HTTP client 20 (e.g. an "Accept-Encoding" header included in an HTTP Request sent by the client 20) does not necessarily force the HTTP server 50 to reply to the client 20 with compressed data contents, nor will it cause errors in the client 20 when the client receives uncompressed data contents in the HTTP Response. Instead, the HTTP server 50 can act according to local policies/status and/or by the format of its current data (for example, compression of data contents may not be allowed in the server 50, or the requested data contents may not be stored by the server 50 in a compressed format and its processing resources may be overloaded when it is replies to the client's Request, etc.).

Known content compression schemes (e.g. compression of HTTP data traffic) have the drawback of not being enforceable by telecommunications networks (for example, the mobile telecommunications network 10 shown in FIG. 1) in an unobtrusive way; for example, without the use of Application Level intermediaries, usually known as "proxies" (such as web proxies, which are servers arranged to mediate in HTTP-based data traffic running between HTTP clients and HTTP servers), as will be discussed below.

For example, since the HTTP server 50 shown in FIG. 1 will generally be located beyond the network domain of the network operator owning the telecom network 10 that is used by the HTTP client 20 to access to the information (generally located in another domain of the Internet, the telecom network 10 will not have the means to influence decisions that can be taken by the HTTP server 50 and, more precisely, the decisions taken by the HTTP server 50 as to whether or not certain data contents to be delivered to the HTTP client 20 are to be compressed.

In the example of FIG. 1, the following situation may arise:
 the HTTP client 20 supports content compression (e.g. HTTP content compression); and
 the HTTP server 50 decides not to send the content compressed due to factors such as static configuration (correct or incorrect), a dynamic decision based on local knowledge, a local overload that prevents the server from devoting local resources to compress contents, etc.

As a result, the load on the transmission resources of the nodes of the telecommunications network 10 used by the UE 20 acting as a client to access the data contents (e.g. Core Network nodes and Radio Access nodes of the telecom network 10 illustrated in FIG. 1), will increase as long as data packets of data flows that terminate and/or originate from user terminals (UEs) attached to a telecom network 10 are not compressed. Similar problems will arise in the telecom network components upstream of the mobile data network 10 (denoted by "Internet 30" in FIG. 1).

Web proxies, such as proxy server 40 shown in FIG. 1, can be introduced in the network to force compression. However, both standard proxy servers and transparent proxies are intrusive technologies in the sense that they either require changes to the client configuration (in the case of standard web proxies, where each client has to be configured to use a given proxy in order to forcefully compress traffic) or may disrupt the functionality of the HTTP protocol.

Web proxies, both standard and transparent, implement the diversion (interception) of the TCP connection establishment. This introduces problems since the mapping between the destination IP address and port and the target URL, as implemented by the client, may not match the one selected by the proxy, as web proxies should not access Transport Layer (i.e. Layer 4) information. Furthermore, the interception of the TCP connection establishment creates problems with connection-oriented authentication schemas, such as a NTLM, since the client browser believes it is talking to a server rather than a proxy. Well-known problems associated with the use of web proxies are set out in RFC 3143 ("Known HTTP Proxy/Caching Problems", June 2001).

In summary, delivering uncompressed data contents over a telecommunications network can overload the transmission capacity of at least some of the network nodes (such as the Radio Access resources utilized by mobile terminals, the Packet Core resources and/or other components of the telecommunications network), thereby reducing network capacity. Different sections of the network will be affected differently but, in general, the transmission of uncompressed data will always have a negative impact on the network's transmission resources. Data compression can help to mitigate this problem. However, known schemes for forcing data compression, particularly those involving the use of proxies (e.g. web proxies and cache servers) have a number of drawbacks, as explained above.

SUMMARY

The present invention provides a method of compressing traffic in a telecommunications system in an elegant, unobtrusive way that does not require any changes to the configuration of the communicating endpoints (whether a client and server in a client-server architecture, or the peers in a peer-to-peer network), that allows traffic to be compressed without impacting on existing communications, and without any cooperation from the endpoints. As will be explained in the following, the method allows the use of the resources of a telecommunications network to be improved in a dynamic and automated manner, which does not have at least some of the above-identified drawbacks that are inherent to the use of proxy servers.

More specifically, the present invention provides in one aspect a method of routing by a policy enforcing point IP datagrams in a two-way communication between a first endpoint in a telecommunications network and a second endpoint in the telecommunications network and compressing, in accordance with a data compression policy, IP datagrams of a response transmitted by the second endpoint to the first endpoint. Each IP datagram comprises a sequence of bytes of data and a header defining a sequence number of the first byte of data in the IP datagram. The response is of a layer 7 protocol that supports compression, a layer level being an Open Systems Interconnection, OSI, layer in an OSI Reference Model. The method comprising determining whether IP datagrams sent by the second endpoint are uncompressed but can be compressed in accordance with the data compression policy by inspecting, in at least one of the received IP datagrams, control information of the layer 7 protocol which is located beyond the IP 5 tuple in the IP datagram. Data in at least some of the received IP datagrams is compressed in response to it being determined that the received IP datagrams are uncompressed but can be compressed, thereby generating compressed IP datagrams for transmission to the first endpoint. The headers in the compressed IP datagrams are modified to take into account a reduction in the number of bytes in one or more preceding IP datagrams caused by compression of the data therein so as to ensure a continuity of said sequence numbers between adjacent compressed IP datagrams in the response transmitted by the second endpoint to the first endpoint. The compressed IP datagrams are transmitted to the first endpoint and acknowledgements of receipt of the compressed IP datagrams are received from the first endpoint. In response to receipt of said acknowledgements, acknowledgments of receipt of the corresponding uncompressed IP datagrams for transmission to the second endpoint are generated. The acknowledgments of receipt of the corresponding uncompressed IP datagrams are then transmitted to the second endpoint.

Thus, in an embodiment of the present invention, following so-called "deep-packet inspection" (DPI) to determine whether IP datagrams sent by the second endpoint are uncompressed but can be compressed, compression is applied by a policy enforcing point (where appropriate, according to the compression policy) to IP datagrams that are being routed from second endpoint to the first endpoint, such that the compressed content is transmitted over a single TCP connection between the endpoints, whose integrity is preserved. No interception of the TCP connection between the endpoints therefore occurs, unlike in the above-mentioned proxy-based schemes of forcing content compression, where the establishment of a separate connection between the proxy and each endpoint is required and precipitates the problems discussed above.

The transparency of the data compression process to the endpoints is achieved by: i) modifying the headers in the compressed IP datagrams to account for a reduction in the number of bytes in one or more preceding IP datagrams that is caused by compression of the data therein so as to ensure a continuity of sequence numbers between adjacent compressed IP datagrams in the response; and ii) converting acknowledgments of receipt of compressed IP datagrams by the first endpoint into acknowledgments of receipt of the corresponding uncompressed IP datagrams for transmission to second endpoint. Thus, the reduction in the number of bytes of data within the TCP stream from the second endpoint (which arises as a consequence of the compression process) can be hidden from both endpoints. In this way, the transfer of data over a TCP connection between the endpoints proceeds as expected from each endpoint's point of view, with the first endpoint receiving, and correctly acknowledging receipt of, bytes of the compressed content, and the second endpoint transmitting, and receiving correct acknowledgments of receipt of, bytes of the uncompressed content. The integrity of the TCP connection can thus be preserved, along with retransmissions, duplicates, and fragmentation.

Aside from the above-mentioned drawbacks of proxy-based schemes of forcing compression, placing a proxy server (e.g. a web proxy or a cache server) or any other kind of Application-Level intermediary in the data path of a communication between endpoints tends to introduce additional transmission delays in cases where the intermediary has to perform data content caching for executing a subsequent compression, once the total (complete) data content related to a client's request is obtained.

To decrease such transmission delays, in an embodiment of the present invention, where the response transmitted by the second endpoint includes a response header and content, the response header comprising a content length indicator which indicates the length of the content in the response, data in the received IP datagrams may be compressed by: removing the content length indicator from the response; compressing data in the received IP datagrams of the response before the last IP datagram of the response is received; and encoding the compressed data into data chunks to generate an encoded compressed response for transmission to the first endpoint, the encoded compressed response comprising an indication that the encoding has been applied. This process of compressing data in the received datagrams avoids the need to await the receipt of the complete (uncompressed) response or a substantial part thereof before compression can start, thereby allowing stream compression of the response to be performed by a policy enforcing point routing flows of IP datagrams originating and/or terminating in an endpoint, and assigned to enforce QoS policies (as determined by QoS parameters) on these flows. In this way, data can be compressed "on the fly", with the first endpoint receiving compressed data in chunks.

For example, in the case where IP datagrams of an HTTP/1.1 Response are routed and compressed, and the Response includes a Content-Length header, the data in the received IP datagrams may be compressed by: removing the Content-Length header from the response; executing a HTTP-compliant compression algorithm to compress data in the received IP datagrams before the last IP datagram of the Response is received; and applying chunked transfer encoding to the compressed data to generate a transfer encoded response comprising a Transfer-Encoding header for transmission to the first endpoint. Since HTTP traffic accounts for a substantial percentage of the total data traffic present in mobile networks, the processing of HTTP/1.1 traffic in this way to achieve a reduction in the bandwidth used by HTTP can increase the capacity of the network with no extra investment, allowing improved resource allocation in mobile networks.

According to another aspect, the present invention provides a telecommunications network policy enforcing point configured to route Internet Protocol, IP, datagrams in a two-way communication between a first endpoint in a telecommunications network and a second endpoint in the telecommunications network and configured to compress, in accordance with a data compression policy, IP datagrams of a response transmitted by the second endpoint to the first endpoint. Each IP datagram of the response comprises a sequence of bytes of data and a header defining a sequence number of the first byte of data in the IP datagram. The response is of a layer 7 protocol that supports compression, a layer level being an Open Systems Interconnection, OSI, layer in an OSI Reference Model. The telecommunications network policy enforcing point comprises a datagram inspection module configured to determine whether IP datagrams sent from the second endpoint and received by the policy enforcing point are uncompressed but can be compressed in accordance with the data compression policy by inspecting, in at least one of the received IP datagrams, control information of the layer 7 protocol which is located beyond an IP 5 tuple in the IP datagram. The telecommunications network policy enforcing point further comprises a data compression module configured to compress data in at least one of the received IP datagrams in response to the datagram inspection module determining that the received IP datagrams are uncompressed but can be compressed, thereby generating compressed IP datagrams for transmission to the first endpoint. The telecommunications network policy enforcing point also includes a header modification module configured to modify the headers in the compressed IP datagrams to take into account a reduction in the number of bytes in at least one preceding IP datagram caused by compression of the data therein by the data compression module so as to ensure a continuity of said sequence numbers between adjacent compressed IP datagrams in the response transmitted by the second endpoint to the first endpoint, and a communication module configured to transmit the compressed IP datagrams to the first endpoint and receive therefrom acknowledgements of receipt of the compressed IP datagrams. The header modification module is further configured to generate, in response to receipt of said acknowledgements by the communication module, acknowledgments of receipt of the corresponding uncompressed IP datagrams for transmission by the communication module to the second endpoint.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Embodiment 1

Figure 2:
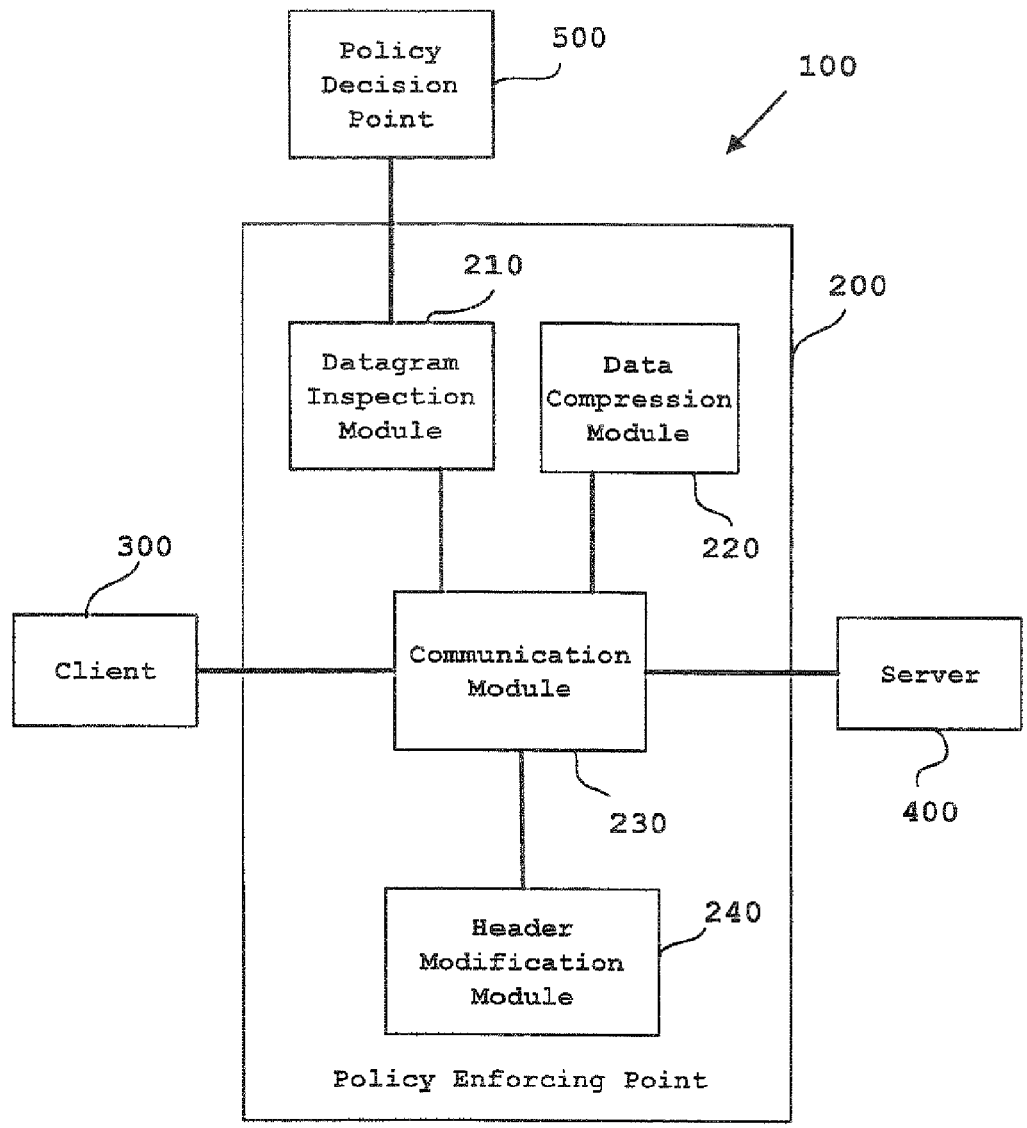
FIG. 2 shows a telecommunications system comprising a Policy Decision Point (PDP), and a Policy Enforcing Point (PEP) according to a first embodiment of the present invention.

FIG. 2 shows a telecommunications system 100 comprising telecommunications network policy enforcing point (PEP) 100 according to a first embodiment of the present invention, which is arranged to route TCP/IP traffic between a first endpoint in the form of an client terminal 300 (e.g. a smart phone) running a web browser HTTP, and a second endpoint, which takes the form of a web server 400. The web server 400 will generally belong to a remote network domain that can be reached via the Internet through the communication resources of the telecommunications network. Details of the Access network and Core network nodes of the telecommunications network, as well as details of the further network (s) interworking between said telecommunications network and the web server 400 are not illustrated in FIG. 2 for sake of simplicity.

The policy enforcing point, PEP 200, shown in FIG. 2 is a network node which serves to route data packet flows that originate and/or terminate in a communication endpoint, and is arranged to enforce admission policies for these flows and to enforce QoS policies on the admitted flows based on policy information and QoS parameters which are commonly received from a policy decision point (PDP) 500, although some of these data can be configured locally within the PEP 200. The QoS parameters can comprise, for example, a QoS class identifier (QCI), which can be a scalar used as a reference to control packet forwarding treatment in the PEP (e.g. scheduling weights, admission thresholds, queue management thresholds, QoS signaling, etc.), or an Allocation and Retention Priority (ARP), which can comprise information about priority and pre-emption with regard to a packet flow (and which can determine e.g. the priority for dropping or maintaining a packet flow in a congestion situation). A particular example of a PEP 200, which will be described in the following, is a telecommunications node implementing the so called "PCEF" functionality in a "PCC Architecture" as described by the 3GPP Specification TS 23.203.

The PEP 200 shown in FIG. 2 is, according to a preferred embodiment, a network node further arranged to enforce at least one data compression policy on data packets of data flows that terminate in (or, where the UE 300 is acting as the server, originate from) the client terminal 300, the policy being optionally stored in the PDP 500. The PEP 200 and the PDP 500 are operationally connected together such that at least one data compression policy stored in the PDP 500 can be retrieved by the PEP 200 and enforced during its operation to compress content from the web server 400.

The components of the PEP 200 and their functional relations are also shown in FIG. 2. The PEP 200 comprises a datagram inspection module 210, a data compression module 220, a communication module 230, and a header modification module 240. Other components of the PEP 200, which are arranged to perform QoS enforcing functions according to known techniques (and which can comprise, for example, modules for packet queue management filtering and classification), are not illustrated in FIG. 2 for the sake of simplicity.

In the present embodiment, the datagram inspection module 210, the data compression module 220, and the header modification module 240 comprise programmable signal processing hardware which implements procedures that may form at least a part of a computer program, module, object or sequence of instructions executable thereby. These procedures, when executed by the signal processing hardware, compress and otherwise process traffic passing between the client terminal 300 and the web server 400 (via the communication module 210) so as to provide unobtrusive and transparent compression of content that is sent to the client terminal 300 by the web server 400 at the request of the client terminal 300, as will be explained in the following.

Figure 1:
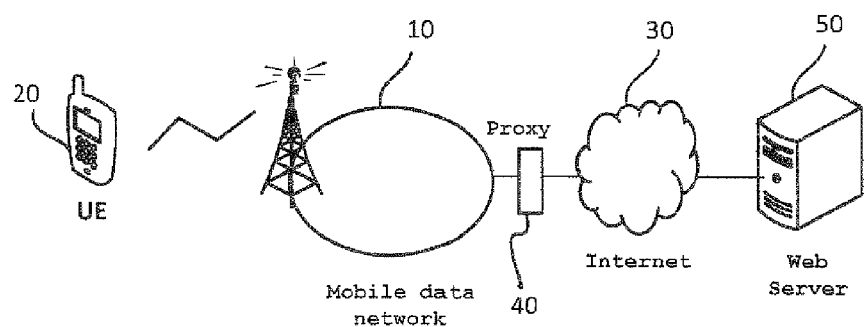
FIG. 1 shows a conventional telecommunications network connecting a mobile terminal to a web server.
Figure 3:
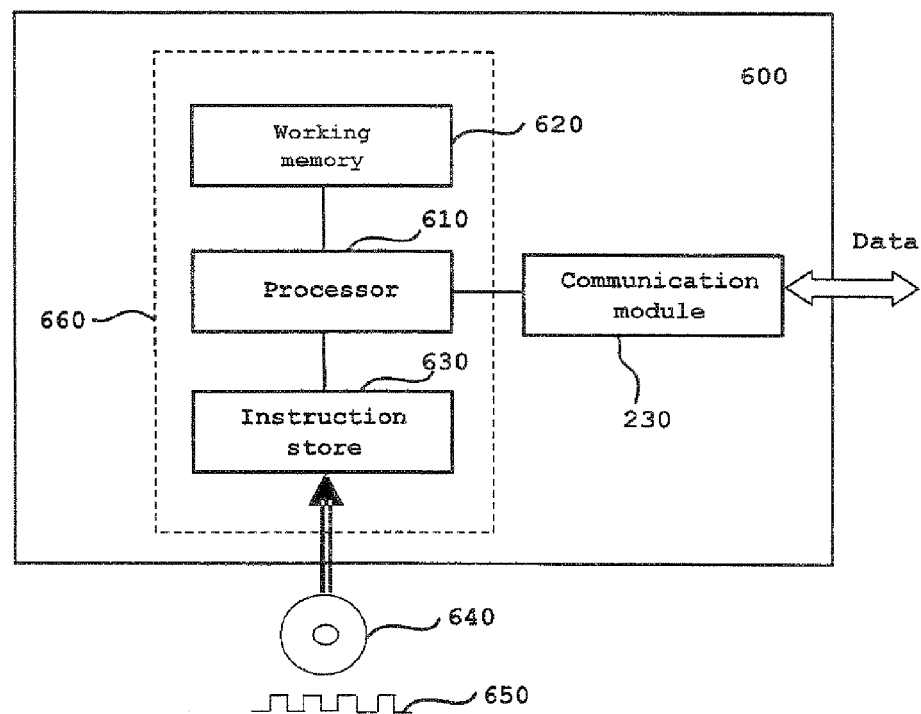
FIG. 3 illustrates an example of programmable computer hardware capable of functioning as the PEP and/or PDP shown in FIG. 2.

An example of a general kind of programmable signal processing apparatus in which PEP 200 may be implemented is shown in FIG. 3. The signal processing apparatus 600 shown comprises, in addition to the communication module 230, a processor 610, a working memory 620, and an instruction store 630 storing computer-readable instructions which, when executed by the processor 610 cause the processor 610 to function as a PEP 200 in performing the processing operations hereinafter described to process packets in the communication between the client terminal 300 and web server 400 and so as to perform stream compression of the content provided by the web server 400 in an efficient and unobtrusive way.

The instruction store 630 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 630 may comprise a volatile memory (e.g. DRAM or SRAM), and the computer-readable instructions can be input thereto from a computer program product, such as a computer-readable storage medium 640 (e.g. an optical disc such as a CD-ROM, DVD-ROM etc.) or a computer-readable signal 650 carrying the computer-readable instructions.

The working memory 620 functions to temporarily store data to support the processing operations executed in accordance with the processing logic stored in the instruction store 630. As shown in FIG. 3, the communication module 230 is arranged to communicate with the processor 610 so as to render the signal processing apparatus 600 capable of processing received signals and communicating its processing results.

The combination 660 of the processor 610, working memory 620 and the instruction store 630 (when appropriately programmed by techniques familiar to those skilled in the art) together constitute the datagram inspection module 210, the data compression module 220, and the header modification module 240 of the PEP 200 shown in FIG. 2. The combination 660 also performs the other operations of the PEP 200 that are described herein.

In the present embodiment, the PDP 500 is a network node entitled to make policy decisions with regard to data packets of data flows that terminate in and/or originate from the client terminal 300 attached to a telecom network, and which are to be enforced by the PEP 200 routing the data packets. In the present embodiment, the PDP 500 is provided as part of a network node that is separate from the PEP 200, for example a separate server which is arranged to communicate via any suitable means (e.g. a LAN or the Internet) with the server implementing the PEP 200. However, the function of PEP 500 may alternatively or additionally be provided by the hardware of the PEP 200; for example, the one or more data compression policies may be stored in the instruction store 640 of the signal processing apparatus shown in FIG. 3.

The operations performed by the PEP 200 of the present embodiment to process stream data will now be described with reference to FIGS. 4 and 5.

Figure 4:
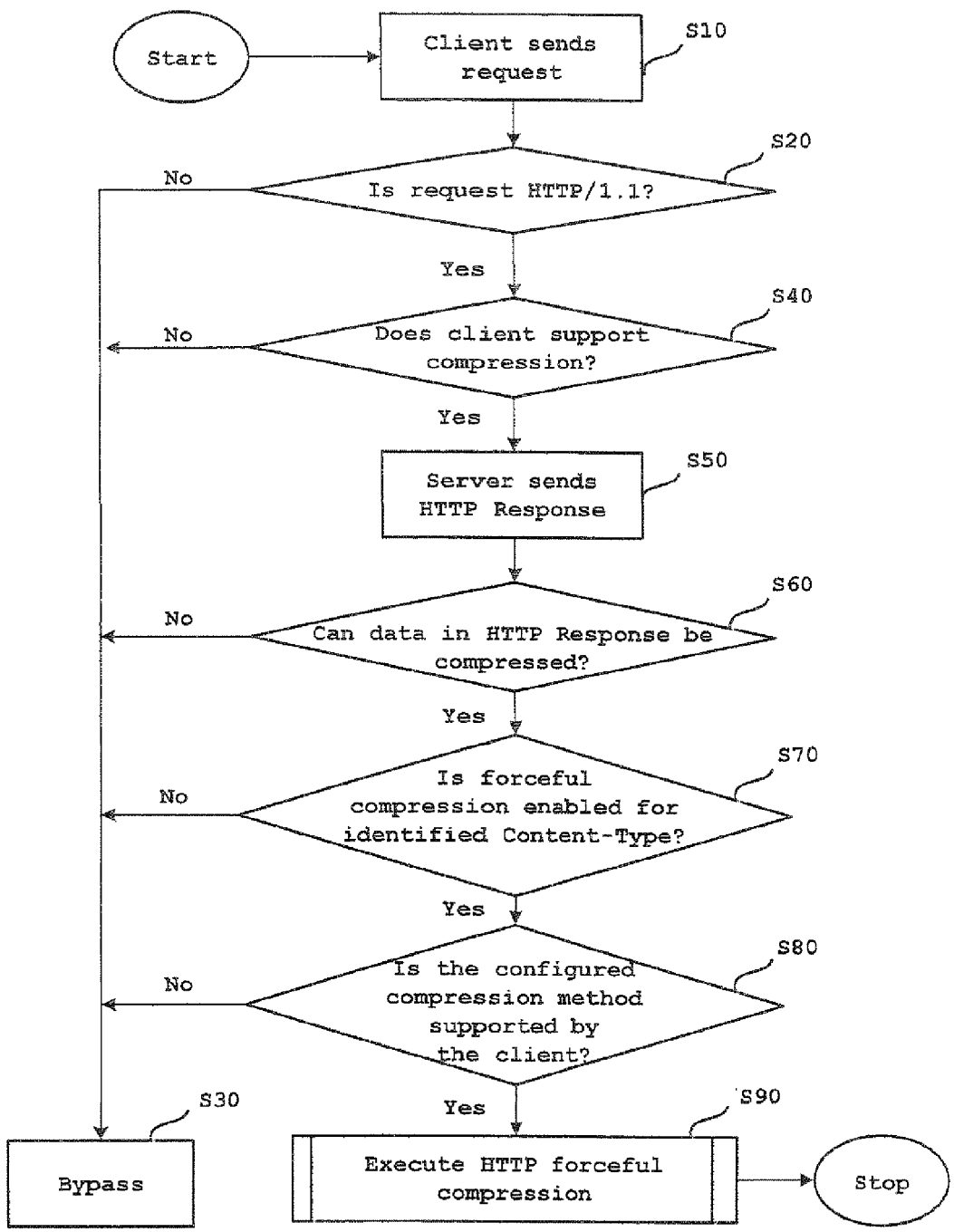
FIGS. 4 and 5 are flow charts illustrating the processing operations performed by the apparatus shown in FIG. 2 to perform unobtrusive stream compression of network traffic.

Referring first to FIG. 4, in step S10, the client terminal 300 establishes a TCP connection to the web server 400 sends an HTTP Request to the web server 400, requesting the web server 400 to send the client terminal 300 certain requested content (e.g. content associated with a particular URL that is stored in the server 400). The PEP 200 routes the HTTP Request to the web server 400.

In step S20, the datagram inspection module 210 of the PEP 200 performs DPI to determine whether the client terminal's Request accords with a suitable communication protocol that supports content compression as an optional feature. In the present embodiment, HTTP/1.1 is taken as an example of such a protocol. If the Request is determined in step S20 not be an HTTP/1.1 Request, then the PEP 200 determines that it will not compress the content of any Response to the Request, and the data packets flowing between the client 300 and the server 400 proceed through the PEP 200 unaltered, bypassing its compression mechanism.

The PEP 200 performs DPI to identify the communication protocol by inspecting, in at least one of the received IP datagrams, control information of the layer 7 protocol which is located beyond the IP 5-tuple in the IP datagram. In data communications utilizing the Internet Protocol as an (inter) Network-Level protocol for data transmissions, an IP 5-tuple is known to comprise: source transport port (i.e. OSI Layer 4 information about the source), source IP-address (i.e. OSI Layer 3 information about the source), destination transport port (i.e. OSI Layer 4 information about the destination), destination IP-address (i.e. OSI Layer 3 information about the destination), and an identifier of the protocol over the IP protocol (e.g. TCP, UDP, etc.). These information elements are located at the beginning of an IP datagram. In essence, DPI comprises inspecting and analyzing the contents of IP datagrams beyond these information elements, i.e. including the payload corresponding to upper communication layers conveyed within the IP datagram.

On the other hand, if the datagram inspection module 210 determines in step S20 that the Request is an HTTP/1.1 Request, the process proceeds to step S40, where the datagram inspection module 210 determines whether the client terminal 300 supports content compression. If the client terminal 300 has indicated to the web server 400 its willingness to accept compressed content in an Accept-Encoding header in the HTTP Request, forceful compression is determined to be acceptable for the client terminal 300, otherwise the process proceeds to step S30 and the compression mechanism of the PEP 200 is bypassed.

In step S50, the web server 400 receives the HTTP Request and responds by sending an HTTP Response containing requested content towards the client terminal 300.

Then, in step S60, the PEP 200 routing the HTTP Response towards the client terminal 300 performs DPI on one or more IP datagrams of the HTTP Response. More specifically, the datagram inspection module 210 determines whether IP datagrams of the HTTP Response, which have been sent by the web server 400 and received by the communication module 230 of the PEP 200, are uncompressed but can be compressed in accordance with at least one data compression policy stored in the PDP 500. To make this determination, the datagram inspection module 210 employs DPI techniques to inspect HTTP control information which is located beyond the IP 5-tuple in the IP datagram. In particular, the value of the HTTP Content-Type header along with the absence of a Content-Encoding header in the response can be used to identify uncompressed content. In step S60, the datagram inspection module 210 also inspects the Content-Type header in an IP datagram and makes a record of the indicated Content Type (e.g. text/html, text/javascript, text/css etc.).

If the content of the HTTP Response is determined in step S60 to not be suitable for compression, the process proceeds to step S30 and the compression mechanism of the PEP 200 is bypassed, otherwise the process continues to step S70.

In step S70, the datagram inspection module 210 determines, on the basis of the Content Type identified in step S60, whether the content delivered by the web server 400 should be compressed by the PEP 200. If it is determined that the content should not be compressed, then the process proceeds to step S30 and the compression mechanism of the PEP 200 is bypassed, otherwise the datagram inspection module 210 determines in step S80 whether the compression method which the PEP 200 is configured to apply is supported by the client terminal 300. If the configured compression method is compatible with the client 300, then stream compression of the web server's Response is performed in step S90, otherwise the process proceeds to step S30 and the compression mechanism of the PEP 200 is bypassed.

In the present embodiment, the determinations in steps S70 and S80 are made by the datagram inspection module 210 in accordance with one or more compression policies stored in the PDP 500, which can be transmitted from the PDP 500 to the PEP 200, or that can be locally configured in the PEP 200. The data compression policy may be based on a record of the client terminal 300 having included in a request to the web server 400 an indication that the client terminal 300 is capable of uncompressing compressed IP datagrams to extract data therein.

Additionally or alternatively, the data compression policy may be based on stored profile data associated with the client terminal 300 or any of its identifiers, which can indicate whether or not the client terminal 300 is capable of uncompressing compressed IP datagrams to extract data therein, or whether or not originally uncompressed contents are to be compressed for said terminal. In this case, the PDP 500 may be interrogated to determine whether the profile data related to the client terminal 300 (e.g. based on identifiers submitted by said client, which are stored in relationship with a corresponding profile data by a node in the telecom network, and which can determine a certain processing of data flows that originate or terminate in the identified client) indicates that client terminal 300 is, according to data in said profile, capable of uncompressing compressed IP datagrams, or whether originally uncompressed contents are to be compressed.

In addition or as a further alternative to either or both the above options, the data compression policy may be based on information defining the types of data which the received IP datagrams are permitted to contain.

In the present embodiment, the determinations in steps S70 and S80 are made by the datagram inspection module 210 referencing a compression policy table stored in the PDP 500, which forms part of the PEP (although the PDP 500 may alternatively be an external network node that is external to but accessible by, the PEP 200, as noted above). The information in the table, on the basis of which the determinations in steps S70 and S80 are made, includes (among other information) an indication of whether the client terminal 300 accepts compressed content, the type of content originally delivered by the web server 400, an indication of whether the content delivered by the web server 400 is already compressed, and the compression techniques to be applied to the content, if any.

For example, in the present embodiment, the policy table is based on Content-Type, Content-Encoding and Transfer-Encoding headers, as shown in Table 1 overleaf (other profile data that may be stored by the PDP 500 in association with an endpoint are omitted for clarity).

TABLE 1

| Accept-Encoding in request | Initial Content-Type in response | Content-Encoding in response | Inserted Transfer-Encoding header |
|---|---|---|---|
| Accept-Encoding: gzip, deflate | Content-Type: text/html; charset=utf-8 | No | Transfer-Encoding: deflate; chunked |
| Accept-Encoding: grip, deflate | Content-Type: text/javascript; charset=utf-8 | No | Transfer-Encoding: deflate; chunked |
| Accept-Encoding: grip, deflate | Content-Type: text/css | No | Transfer-Encoding: deflate; chunked |
| ... | ... | ... | ... |

This compression policy table could be introduced in the PEP 200 by means of local configuration. The definition of the initial Content-Type headers in the response could contain wildcards (*) to express "anything" and generally to avoid having to specify information not necessary for the compressions, for instance character sets. This way, the following Content-Type:

Content-Type: text/html* should match these two Content-Type headers:

Content-Type: text/html; charset=utf-8
Content-Type: text/html; charset=iso-8859-2

Thus, the PEP 200 of the present embodiment is able to implement DPI techniques to identify HTTP responses with: no Content-Encoding header; the Content-Type header matching one in the table above; and a previous (matching) request containing an Accept-Encoding header supporting the compression algorithm included in the table.

Referring again to FIG. 4, in step S90, the data compression module 220 compresses data in the received IP datagrams in response to the datagram inspection module 210 determining that the received IP datagrams are uncompressed but can be compressed in accordance with the compression policy in the PDP 500, thereby generating compressed IP datagrams for transmission by the communication module 230 to the client terminal 300. In the present embodiment, the PEP 200 uses HTTP transfer encoding to compress the content "on the fly", that is, without having to await the receipt of the entire HTTP Response before compression can begin. By applying stream compression in this way, the caching of contents and the ensuing delays in the transmission of content by the PEP 200 can be avoided. In addition, as there is no need to allocate extra storage resources to buffering content prior to its compression, the PEP 200 of the present embodiment is less demanding on hardware resources than the conventional proxy-based solution mentioned above.

Details of how data compression is performed by the data compression module 220 will now be described with reference to the flow chart in FIG. 5.

Figure 5:
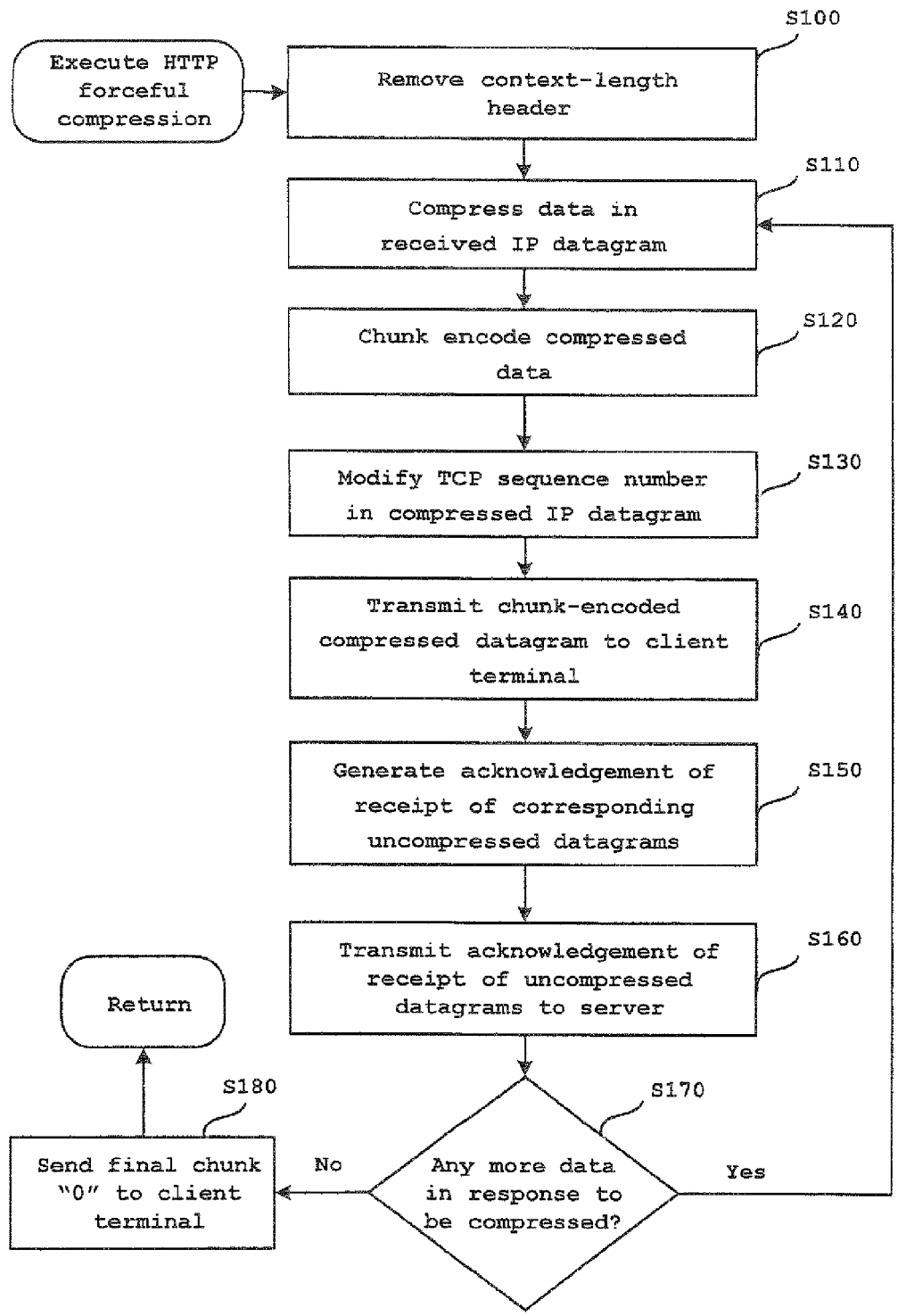

FIG. 5 illustrates the process by which the PEP 200 performs chunked transfer encoding and stream compression to compress the content of the HTTP Response which is sent by the web server 300 and addressed to the client terminal 300. Using transfer encoding (a standard HTTP transmission mechanism) allows the PEP 200 to compress the content "on the fly", that is, without waiting for all the content to arrive, and without knowing beforehand the total length of the content.

Chunked transfer encoding is a data transfer mechanism in HTTP/1.1 in which the "Transfer-Encoding" header is used in place of the "Content-Length" header and allows content to be delivered in chunks. The Content-Length header is not used, and because of that, the web server 400 is not required to know the total length of the content before the delivery starts. Chunked transfer encoding can be used, for example, to transmit responses with dynamically-generated content before the total size of the content is known. Further details of chunked HTTP transmission are provided in RFC 2616 ("Hypertext Transfer Protocol—HTTP/1.1", June 1999).

In step S100 of FIG. 5, a content length indicator forming part of the server's Response, which, takes the form of the Content-Length header of the HTTP Response of the HTTP server 400 in the present embodiment, is removed from the Response by the data compression module 220.

Then, in step S110, the data compression module 220 employs a stream compression algorithm to compress data extracted from the received IP datagrams of the web server's Response "on the fly", before the last IP datagram of the Response is received by the PEP 200. Stream compression algorithms are characterised by the fact that they do not need to access the complete content in order to compress it. This is advantageous since the content in the HTTP Response will arrive to the PEP 200 as a stream. The data compression module 220 may make use of any suitable compression algorithm, which can be selected in accordance with user requirements. The standardised "deflate" compression scheme is one well-known example. More information on this algorithm can be found in RFC 1950 ("ZLIB Compressed Data Format Specification version 3.3", May 1996).

In step S120, the data compression module 220 encodes the compressed data into data chunks to generate an encoded compressed response for transmission by the communication module 230 to the client terminal 300, the encoded compressed response comprising an indication that the encoding has been applied. More particularly, in the present embodiment, the data compression module 220 applies chunked transfer encoding to the compressed data to generate a transfer encoded response, which includes a Transfer-Encoding header, and forwards the encoded response to the communication module 230 for transmission to the client terminal 300.

The Transfer-Encoding header is inserted by the data compression module 220 in accordance with the indications provided in Table 1 above (and built from local configuration). The value of the Transfer-Encoding header contains the stream compression algorithm being used and the transmission mechanism that is always set to "chunked". It is noted that the order in which the compression algorithm and transmission mechanism are specified matters, and indicates the order in which these transformations are performed. In the present embodiment, compression should be indicated as having been performed first, leaving the "chunking" as the last transformation. Since an HTTP response containing a Transfer-Encoding header does not require a Content-Length, the Content-Length header should be removed, so as not to reach the client terminal 400. In this regard, it is noted that the above-mentioned removal of the Content-Length header in step S100 may alternatively be performed following step S110 or following step S120, provided the Content-Length header is removed before the encoded, compressed Response is sent to the client terminal in step S130.

Thus, for every TCP segment containing parts of the HTTP Response, the PEP 200 compresses the content according to the stream compression algorithm configured in the Transfer-Encoding and sends it as an HTTP "chunk" to the client terminal 300. HTTP chunks start with their size followed by the encoded content and finish with a Carriage Return and Line Feed (CRLF). The end of the transmission is indicated by a final "chunk" of size zero.

In step S130, the header modification module 240 modifies the header in each compressed IP datagram in order to compensate for a reduction in the number of bytes in one or more preceding IP datagrams that is caused by compression of the data therein, thereby ensuring a continuity of said sequence numbers between adjacent compressed IP datagrams in the HTTP Response. In this context, the "continuity" refers to there being no intervening integer(s) between the Sequence number of the last byte of data in a given datagram and the Sequence number of the first byte of data in the following datagram. As an example, if an uncompressed IP datagram received by the PEP 200 has the number "n" in the Sequence number field of its header and contains M bytes of data, and the next uncompressed IP datagram to be received has the number "n+M" as the Sequence number in its header, and if the payload of the first of these datagrams is compressed by the PEP 200 so as to contain only m bytes (where m<M), then the header modification module 240 will decrease the Sequence number indicated in the second (following) datagram from "n+M" to "n+m", to account for the reduction in the number of bytes from M to m that is caused by the compression processing.

In step S140, the communication module 230 transmits the compressed IP datagrams (carrying the compressed "chunks") to the client terminal 300. Upon receiving the compressed IP datagrams, the client terminal 300 acknowledges receipt of the bytes in each compressed datagram in accordance with the TCP protocol. More specifically, the client terminal 300 acknowledges receipt using a TCP "ACK" that specifies the next TCP Sequence number which the client terminal 300 expects to receive. These acknowledgments are then received by the communication module 230 of the PEP 200.

Since the compression mechanism changes the length of the data in the server's reply at the Application Level (HTTP), as explained above, the TCP Acknowledgments in the underlying TCP connection should be also be corrected in a corresponding manner for the remainder of the underlying TCP connection, to make the changes transparent to the HTTP client 300 and the HTTP server 400.

For this reason, upon receipt of the Acknowledgments by the communication module 230 from the client terminal 300, the header modification module 240 generates in step S150 TCP Acknowledgments of receipt of the corresponding uncompressed IP datagrams for transmission to the web server 400. This is done by increasing the Acknowledgment number specified in the client terminal's Acknowledgment to compensate for the reduction in the number of bytes in the segment that is caused by the content compression performed by the PEP 200. The header modification module 240 also performs a consequential modification of the "Checksum" TCP field, which needs to be recalculated after the TCP header and the HTTP application data are modified. The process of correcting the Sequence number, Acknowledgment number and the Checksum TCP fields continues until the underlying TCP connection is closed. This may not happen after the current Response is finished, and other Responses may arrive on the same TCP connection if, for example, pipelining is enabled. TCP Sequence number mangling is a known procedure and is used in other techniques (for instance in Content Enrichment).

In step S160, the communication module 230 transmits the acknowledgments of receipt of the corresponding uncompressed IP datagrams to the web server 400.

Then, in step S170, the PEP 200 checks whether the latest IP datagram(s) to be processed in steps S110 to S160 was/were the last of the Response from the web server 400. If not, the execution of steps S110 to S160 continues until the processing of the server's Response is complete. Upon completing the compression process, the PEP 200 signals the end of the transmission of compressed content to the client terminal 300 by sending a final "chunk" of size zero to the client terminal 300 in step S180.

Thus, in the present embodiment, the payloads of the datagrams of the HTTP Response from the server 400 are compressed by the PEP 200 while the Sequence numbers in their TCP headers, and the Acknowledgments numbers provided by the client 300, are modified by the header modification module 240 of the PEP 200 to ensure transparency of the stream compression being performed by the PEP 200. The number of datagrams carrying the HTTP Response is not changed by the PEP 200 in the present embodiment. In an alternative embodiment, datagram agrupation could be employed so that e.g. where two uncompressed datagrams arrive together at the PEP 200, the PEP 200 generates only one compressed datagram for transmission to the client terminal 300.

Figure 6:
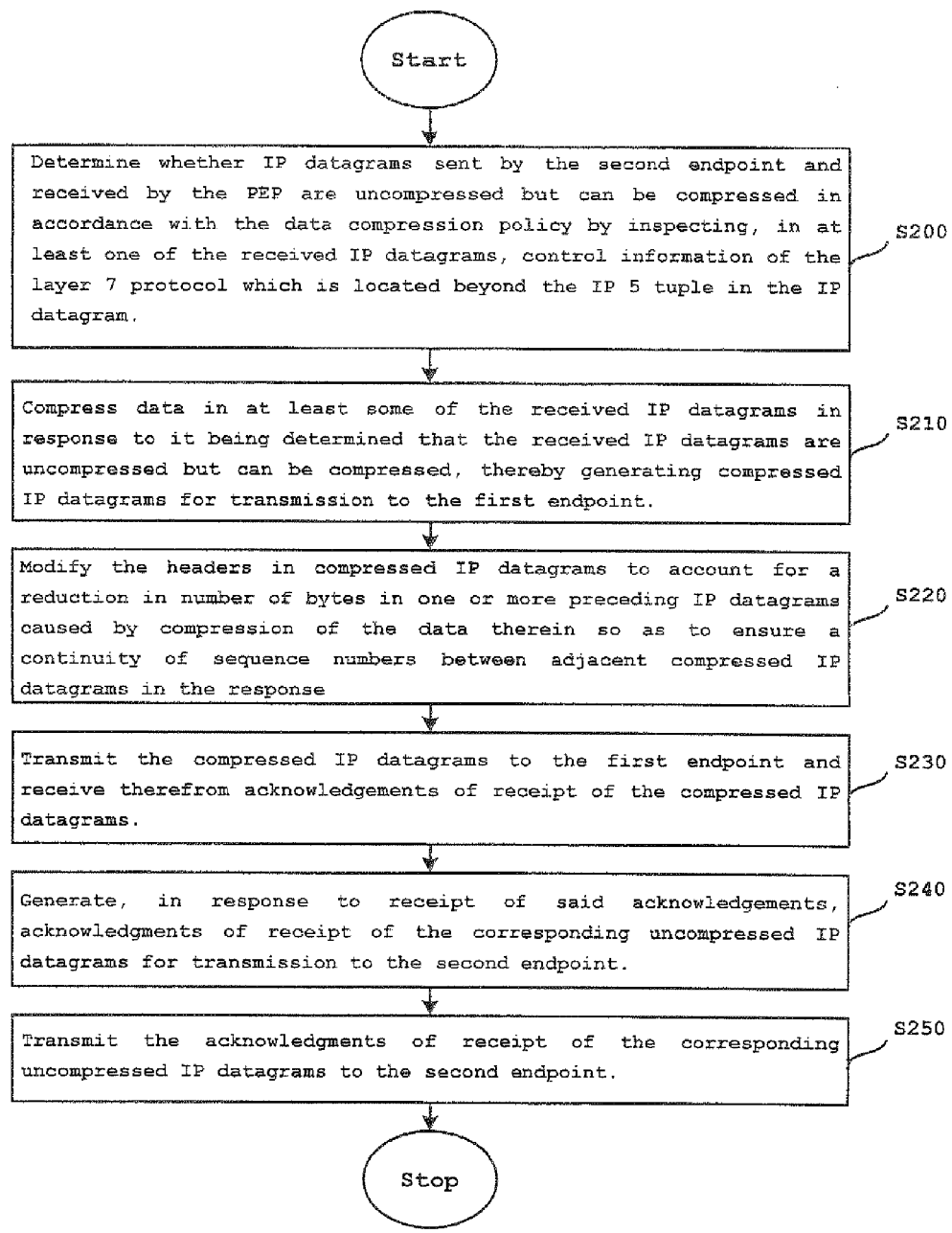
FIG. 6 summarises key processing operations performed by the PEP according to the first embodiment of the present invention.

In summary, the PEP 200 is configured to perform the key processing steps shown in FIG. 6. Thus, in step S200, the datagram inspection module 210 determines whether IP datagrams sent from the second endpoint (i.e. the web server 400) and received by the PEP 200 are uncompressed but can be compressed in accordance with the data compression policy by inspecting, in at least one of the received IP datagrams, control information of the layer 7 protocol (i.e. HTTP/1.1 in the present embodiment) which is located beyond the IP 5 tuple in the IP datagram.

In step S210, the data compression module 220 compresses data in at least some of the received IP datagrams in response to the datagram inspection module 210 determining that the received IP datagrams are uncompressed but can be compressed, thereby generating compressed IP datagrams for transmission to the first endpoint (i.e. the client terminal 300).

In step S220, the header modification module 240 modifies the headers in the compressed IP datagrams to take into account a reduction in the number of bytes in one or more preceding IP datagrams caused by compression of the data therein so as to ensure a continuity of said sequence numbers between adjacent compressed IP datagrams in the response transmitted by the second endpoint 400 to the first endpoint 300.

In step S230, the communication module 230 transmits the compressed IP datagrams to the first endpoint 300 and receives therefrom acknowledgements of receipt of the compressed IP datagrams.

Then, in step S240, the header modification module 240 generates, in response to receipt of said acknowledgements by the communication module 230, acknowledgments of receipt of the corresponding uncompressed IP datagrams for transmission by the communication module 230 to the second endpoint 400.

Finally, in step S250, the communication module 230 transmits the acknowledgments of receipt of the corresponding uncompressed IP datagrams to the second endpoint 400.

Figure 7:
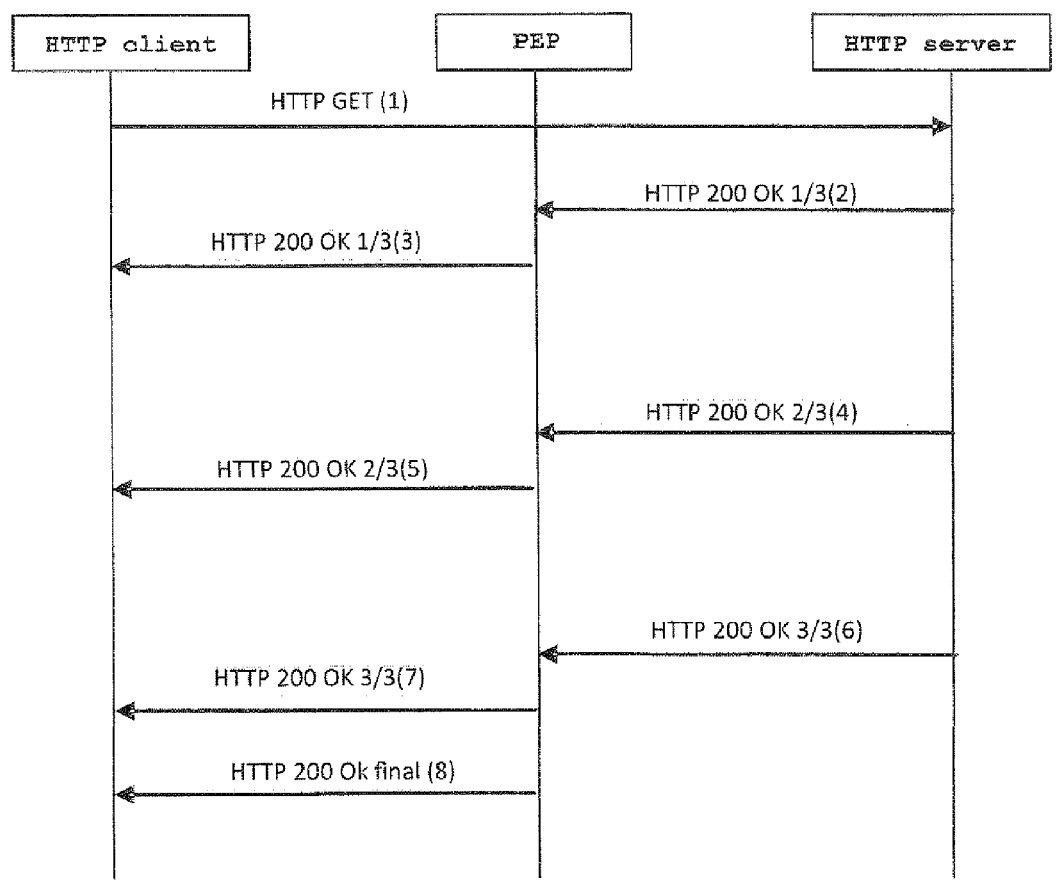
FIG. 7 illustrates stream compression of an HTTP Response that may be performed by a PEP according to the first embodiment.

An application of the above-described compression technique to perform stream compression of content will now be described with reference to FIG. 7.

In step 1, the HTTP client 300 requests some content using an HTTP GET with at least the following header:

Accept-Encoding: deflate

In step 2, the server 400 responds with a 200 OK response with the following relevant headers:

Content-Type: text/css
Content-Length 4729

(and not containing a Content-Encoding header).

The first TCP segment of the response in step 2 contains some of the uncompressed body, with a length which is smaller than the value in the Content-Length, or equal if all the content fits into a segment. For example, the body in the first TCP segment may be as follows:

Example of uncompress text in the body

If the client terminal 300 and/or the web server 400 are configured in the PEP 200 (or in the PDP 500, in which case the PEP has to ask the PDP first) to have HTTP forceful compression enabled for this flow and the compression algorithm configured is supported in the Accept-Encoding header of the Request sent by the client terminal 300 in step 1, the PEP 200 applies compression to the response. The new response (in step 3) will have the following HTTP headers:

Content-Type: text/css
Transfer-Encoding: deflate; chunked

The Content-Type header is not be modified (the entity does not change; the PEP 200 only applies a transformation on the message) and the Content-Length header is removed.

The available body in step 2 is compressed using the configured algorithm (deflate) and sent as a "chunk" in step 3:

07
0A 7F 37 7A 37 58 E2, starting with the length of the "chunk" (07), followed by the compressed body (compressed version of "Example of uncompress text in the body"), and ending with a CRLF.

The process is repeated in steps 5 and 7 for steps 4 and 6. In step 6, the PEP 200 detects that the server 400 has sent all of the content. The PEP 200 maintains a counter recording the number of bytes received, and when that counter reaches the original value of the Content-Length, a final "chunk" with length zero is sent to notify the client 300 of the end of the transaction (step 7). In addition, the TCP checksum is recalculated by the PEP 200 after the TCP header and the HTTP application data are modified.

As the compression implemented by the PEP 200 reduces the length of the data after all the relevant HTTP headers are inserted, modified or deleted, the TCP Sequence number of (3) is reduced by the PEP 200 accordingly.

The TCP Acknowledgements from the HTTP client 300 to the HTTP server 400 between steps 3 and 5 (not shown in FIG. 7 since the messages have no body) are modified by the PEP 200 with the correct Acknowledgment number towards the HTTP server 400, which will be unaware of the transformation introduced to the content. The PEP 200 (specifically, the header modification module 220 thereof) compensates for this by acknowledging receipt of the corresponding uncompressed packets that transmitted by the HTTP server 400.

The process of correcting the Sequence number and Acknowledgment number (as well as the TCP Checksum) continues until the TCP connection is closed. This may not happen after the current Response is finished, and other Responses may arrive on the same TCP connection if, for example, pipelining is enabled.

Embodiment 2

Figure 8:
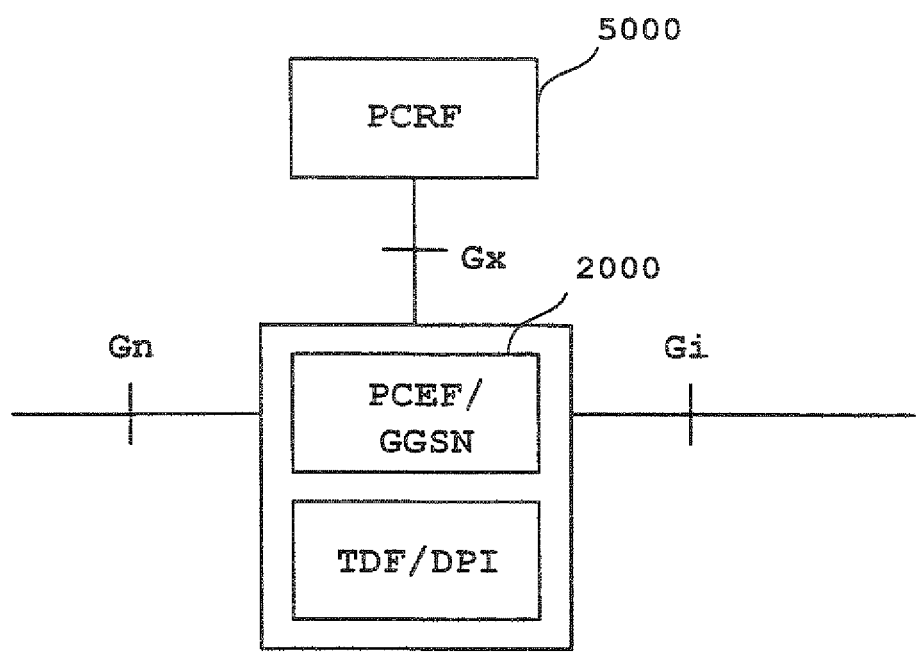
FIG. 8 shows telecommunications system comprising a PDP and a PEP according to a second embodiment of the present invention.

A telecommunications system comprising a network policy enforcing point according to a second embodiment of the present invention will now be described with reference to FIG. 8.

In the present embodiment, the telecommunications network to which the client terminal attaches, and which provides it with data connectivity services towards e.g. a server located in another network domain, comprises nodes of an architecture (referred as "Policy and Charging Control", PCC, architecture) as disclosed by the 3GPP Specification TS 23.203 ("Policy and Charging Control Architecture", v. 11.2.0, June 2011), wherein the PEP 200 and the PDP 500 illustrated in FIG. 2 are implemented, respectively, by nodes performing as a "Policy and Charging Enforcement Function" (PCEF) 2000 and a "Policy and Charging Rules Function" (PCRF) 5000 within said PCC architecture telecommunications network. The node implementing the PCEF functionality in FIG. 8 also provides so-called "Traffic Detection Function" (TDF) functionality by using DPI, for example.

In a telecommunications network according to the PCC architecture, forceful compression is performed by the PCEF 2000 on uncompressed content of data packets routed through it. For example, if the telecommunications network comprises a GPRS, then the PCEF 2000 functionalities of the PCC-compliant architecture of said network can be implemented by a Gateway GPRS Support Node (GGSN); therefore, in this embodiment the forceful compression described above can be performed on data packets of data flows received and/or sent through the so-called "Gi" and "Gn" interfaces of the GGSN.

The policy information determining whether to forcefully compress uncompressed content can be configured locally or downloaded from a PCRF 5000 via the so-called "Gx" interface for some subscribers (or all of them) and for a subset of the traffic they receive (or for all of it).

The implementation of the PEP 200 and PDP 500 in the respective forms of a PCEF 2000 and a PCRF 5000 of a PCC architecture telecoms network provides the further advantage of extending, with a minimum impact, the unobtrusive content compression scheme, which has been described above by way of the first embodiment, to state-of-the-art telecoms networks (such as the one disclosed by e.g. 3GPP Spec TS 23.203 V11.2.0), in which the presence of web proxies or cache servers, or similar functional nodes, is not envisaged. In particular, the functionality of PCEF 2000 in a PCC architecture is described in the 3GPP Specification TS 23.203, and, more specifically, in the chapter 6.2.2 of said document. It is apparent from said disclosure that the PCEF, as a policy enforcing point (PEP), is transparent to a communication endpoint for which, it routes its data packet flows in the sense that e.g. its intervention does not need to be configured within the endpoint, and in that the PCEF does not serve to hide characteristics of the endpoint, but to enforce admission and QoS policies on its related data flows according to known techniques.

Furthermore, the present embodiment has the advantage of allowing mobile network operators to force compression of content based on their own needs and requirements, irrespective of the format of the content sent by the web servers. This solution allows for dynamic changes to the forceful compression (via for instance the Gx interface), allowing operators to adapt the bandwidth used by HTTP to the conditions of the network (compression on demand).

The PCEF 2000 may be locally configured to define the transformations (compression) required (for example, according to Table 1 above). However, the selection of the HTTP services (URL or set of URLs) and subscribers to apply forceful compression to can be configured locally or downloaded from the PCRF 5000, which functions as the PDP.

The following provides an example of how the transformations may be configured:

```
content-compression
    rule COMPRESS-HTML
        content text/css* encode deflate
        content text/html* encode deflate
    end
end
```

The rule "COMPRESS-HTML" compresses HTML or CSS content using "deflate" compression.

The transformations required could be configured for all HTTP traffic or for a set of HTTP services. This could be applied to all subscribers or to a subset of subscribers. The PREF 2000 could be locally configured to apply forceful compression with the required granularity.

Alternatively, the PCRF 5000 implementing the PDP could download the forceful compression policies (or a pointer to those policies) per subscriber session using for instance the Gx interface (or others) between the PCEF 2000 and the PCRF 5000. If the Gx interface is extended to download that information, it should preferably take precedence over local configuration policies stored by the PCEF 2000.

In the present embodiment, a new AVP (Content-Compression-Profile-Id) of type enumerated and unencrypted is used to download a pointer to the forceful compression policies locally configured in the PCEF 2000. The PCRF 5000 is operable to control which policies (if any) are applied by pointing to a profile containing different sets of forceful compression rules.

A profile pointer indicating a profile not configured may be used to enable the default profile (which may or may not contain content compression rules).

Modifications and Variations

Many modifications and variations can be made to the embodiments described above.

For example, the ordering of the process steps in the flow diagram of FIGS. 4 and 5 may be varied in any suitable and desirable way. Thus, in FIG. 4, steps S20 and S40 may be interchanged, as may steps S70 and S80, for example.

Although the endpoints of the embodiments described above share content using HTTP/1.1, another application protocol "P" may alternatively be used, provided it meets certain criteria which will now be explained.

Figure 9:
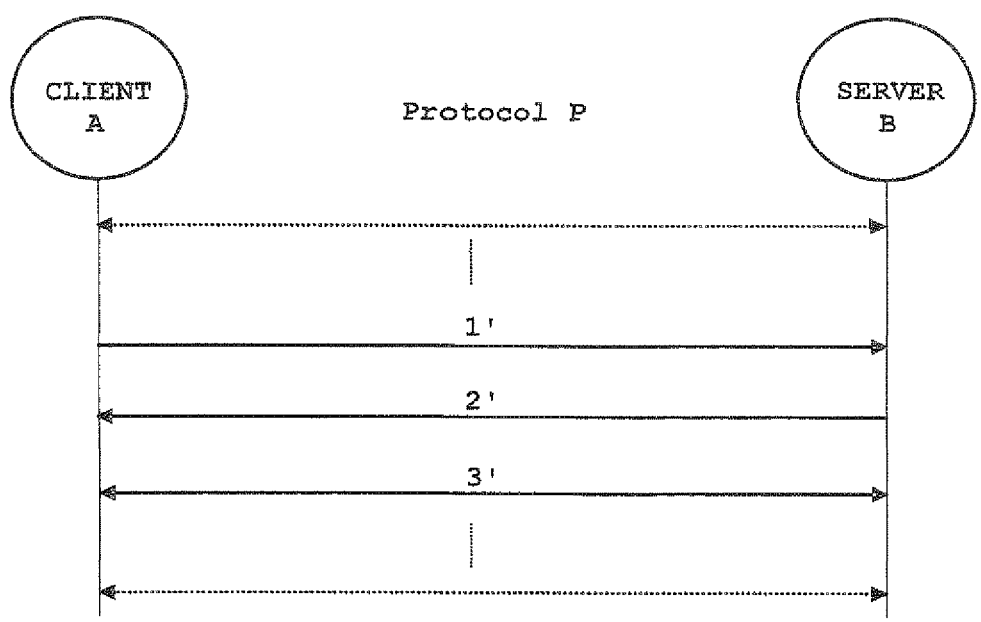
FIG. 9 illustrates certain features of a communication protocol P that may be employed in embodiments of the present invention.

FIG. 9 depicts schematically a data communication between an endpoint A and an endpoint B, using a generic application protocol "P" having certain characteristics (nodes mediating in said end-to-end communication are not shown in FIG. 9 for simplicity).

Given the generic protocol P, which follows the client-server architecture, where A is the client and B is the server, the data compression method described above may be implemented using any protocol P that fulfils the following criteria:
i) Protocol P supports compression of contents as an optional feature, so that content compression is not always enabled for protocol P;
ii) The client A and the server B can negotiate content compression by exchanging messages (1') and (2') (which are not necessarily the first and the second messaged exchanged between A and B for this particular communication); and
iii) If the negotiation between A and B is successful it enabling content compression, content in (3') is exchanged compressed.

In the embodiments described above the datagram inspection module 210, the data compression module 220, the communication module 230, and the header modification module 240 of the PEP 200 shown in FIG. 2 are each provided using programmable processing apparatus 600 having a processor 620 which provides the respective functions of these components by executing software instructions stored in instructions store 640. However, it will be appreciated that one or more of the aforementioned components may alternatively be implemented in non-programmable hardware dedicated to performing the function(s) of these one or more components, e.g. an ASIC or FPGA.

The invention claimed is:

1. A telecommunications network policy enforcing point configured to route Internet Protocol (IP) datagrams in a two-way communication between a first endpoint in a telecommunications network and a second endpoint in the telecommunications network and configured to compress, in accordance with a data compression policy, IP datagrams of a response transmitted by the second endpoint to the first endpoint, each IP datagram comprising a sequence of bytes of data and a header defining a sequence number of the first byte of data in the IP datagram, the response being of a layer 7 protocol that supports compression, a layer level being an Open Systems Interconnection (OSI) layer in an OSI Reference Model, the telecommunications network policy enforcing point comprising:
   a datagram inspection module configured to determine whether IP datagrams sent from the second endpoint and received by the policy enforcing point are uncompressed but can be compressed in accordance with the data compression policy by inspecting, in at least one of the received IP datagrams, control information of the layer 7 protocol which is located beyond an IP 5 tuple in the IP datagram;
   a data compression module configured to compress data in at least one of the received IP datagrams in response to the datagram inspection module determining that the received IP datagrams are uncompressed but can be compressed, thereby generating compressed IP datagrams for transmission to the first endpoint;

a header modification module configured to modify the headers in the compressed IP datagrams to take into account a reduction in the number of bytes in at least one preceding IP datagram caused by compression of the data therein by the data compression module so as to ensure a continuity of said sequence numbers between adjacent compressed IP datagrams in the response transmitted by the second endpoint to the first endpoint;

a communication module configured to transmit the compressed IP datagrams to the first endpoint and receive therefrom acknowledgements of receipt of the compressed IP datagrams; and the header modification module being further configured to generate, in response to receipt of said acknowledgements by the communication module, acknowledgments of receipt of the corresponding uncompressed IP datagrams for transmission by the communication module to the second endpoint.

2. The telecommunications network policy enforcing point of claim 1, wherein the response comprises a response header and content, and the response header comprises a content length indicator which indicates a length of the content in the response; and wherein the data compression module is further configured to:
remove the content length indicator from the response;
compress data in the received IP datagrams of the response before the last IP datagram of the response is received by the telecommunications network policy enforcing point; and
encode the compressed data into data chunks to generate an encoded compressed response for transmission by the communication module to the first endpoint, the encoded compressed response comprising an indication that the encoding has been applied.

3. The telecommunications network policy enforcing point of claim 2, wherein the data compression policy is based on at least one of:

a record of the first endpoint having included in a request to the second endpoint an indication that the first endpoint is capable of uncompressing compressed IP datagrams to extract data therein;

stored profile data of the first endpoint indicating one of that the first endpoint is capable of uncompressing compressed IP datagrams to extract data therein and that originally uncompressed IP datagrams, that are to be transmitted to said first endpoint, can be compressed; and information defining types of data which the received IP datagrams are permitted to contain.

4. The telecommunications network policy enforcing point of claim 2, further configured to route and compress IP datagrams of a HTTP/1.1 response, wherein the response comprises a Content-Length header; and wherein the data compression module is configured to:
remove the Content-Length header from the response;
execute a HTTP-compliant compression algorithm to compress data in the received IP datagrams before the last IP datagram of the response is received by the telecommunications network policy enforcing point; and
apply chunked transfer encoding to the compressed data to generate a transfer encoded response comprising a Transfer-Encoding header for transmission to the first endpoint.

5. The telecommunications network policy enforcing point of claim 1, further configured to route and compress IP datagrams of a HTTP/1.1 response, wherein the response comprises a Content-Length header; and wherein the data compression module is configured to:
remove the Content-Length header from the response;
execute a HTTP-compliant compression algorithm to compress data in the received IP datagrams before the last IP datagram of the response is received by the telecommunications network policy enforcing point; and
apply chunked transfer encoding to the compressed data to generate a transfer encoded response comprising a Transfer-Encoding header for transmission to the first endpoint.

6. The telecommunications network policy enforcing point of claim 5, wherein the data compression policy is based on at least one of:

a record of the first endpoint having included in a request to the second endpoint an indication that the first endpoint is capable of uncompressing compressed IP datagrams to extract data therein;

stored profile data of the first endpoint indicating one of that the first endpoint is capable of uncompressing compressed IP datagrams to extract data therein and that originally uncompressed IP datagrams, that are to be transmitted to said first endpoint, can be compressed; and information defining types of data which the received IP datagrams are permitted to contain.

7. The telecommunications network policy enforcing point of claim 1, wherein the data compression policy is based on at least one of:

a record of the first endpoint having included in a request to the second endpoint an indication that the first endpoint is capable of uncompressing compressed IP datagrams to extract data therein;

stored profile data of the first endpoint indicating one of that the first endpoint is capable of uncompressing compressed IP datagrams to extract data therein and that originally uncompressed IP datagrams, that are to be transmitted to said first endpoint, can be compressed; and information defining types of data which the received IP datagrams are permitted to contain.

8. A Policy and Charging Enforcing Function (PCEF) node of a Policy and Charging Control (PCC) architecture telecommunications network, the PCEF node is configured to communicate with a Policy and Charging Rules Function (PCRF) node via a Gx interface to obtain a data compression policy, the PCEF comprising a telecommunications network policy enforcing point configured to route Internet Protocol (IP) datagrams in a two-way communication between a first endpoint in a telecommunications network and a second endpoint in the telecommunications network and configured to compress, in accordance with the data compression policy, IP datagrams of a response transmitted by the second endpoint to the first endpoint, each IP datagram comprising a sequence of bytes of data and a header defining a sequence number of the first byte of data in the IP datagram, the response being of a layer 7 protocol that supports compression, a layer level being an Open Systems Interconnection (OSI) layer in an OSI Reference Model, the telecommunications network policy enforcing point comprising:

a datagram inspection module configured to determine whether IP datagrams sent from the second endpoint and received by the policy enforcing point are uncompressed but can be compressed in accordance with the data compression policy by inspecting, in at least one of the received IP datagrams, control information of the layer 7 protocol which is located beyond an IP 5 tuple in the IP datagram;

a data compression module configured to compress data in at least one of the received IP datagrams in response to the datagram inspection module determining that the received IP datagrams are uncompressed but can be compressed, thereby generating compressed IP datagrams for transmission to the first endpoint;

a header modification module configured to modify the headers in the compressed IP datagrams to take into account a reduction in the number of bytes in at least one preceding IP datagram caused by compression of the data therein by the data compression module so as to ensure a continuity of said sequence numbers between adjacent compressed IP datagrams in the response transmitted by the second endpoint to the first endpoint;

a communication module configured to transmit the compressed IP datagrams to the first endpoint and receive therefrom acknowledgements of receipt of the compressed IP datagrams; and the header modification module being further configured to generate, in response to receipt of said acknowledgements by the communication module, acknowledgments of receipt of the corresponding uncompressed IP datagrams for transmission by the communication module to the second endpoint.

9. A method of routing by a policy enforcing point Internet Protocol (IP) datagrams in a two-way communication between a first endpoint in a telecommunications network and a second endpoint in the telecommunications network and compressing, in accordance with a data compression policy, IP datagrams of a response transmitted by the second endpoint to the first endpoint, each IP datagram comprising a sequence of bytes of data and a header defining a sequence number of the first byte of data in the IP datagram, the response being of a layer 7 protocol that supports compression, a layer level being an Open Systems Interconnection (OSI) layer in an OSI Reference Model, the method comprising:

determining whether IP datagrams sent by the second endpoint are uncompressed but can be compressed in accordance with the data compression policy by inspecting, in at least one of the received IP datagrams, control information of the layer 7 protocol which is located beyond an IP 5 tuple in the IP datagram;

compressing data in at least one of the received IP datagrams in response to it being determined that the received IP datagrams are uncompressed but can be compressed, thereby generating compressed IP datagrams for transmission to the first endpoint;

modifying the headers in the compressed IP datagrams to take into account a reduction in the number of bytes in one or more preceding IP datagrams caused by compression of the data therein so as to ensure a continuity of said sequence numbers between adjacent compressed IP datagrams in the response transmitted by the second endpoint to the first endpoint;

transmitting the compressed IP datagrams to the first endpoint and receiving therefrom acknowledgements of receipt of the compressed IP datagrams;

generating, in response to receipt of said acknowledgements, acknowledgments of receipt of the corresponding uncompressed IP datagrams for transmission to the second endpoint; and transmitting the acknowledgments of receipt of the corresponding uncompressed IP datagrams to the second endpoint.

10. The method of claim 9, wherein the response comprises a response header and content, and the response header comprises a content length indicator which indicates a length of the content in the response, and wherein data in the received IP datagrams is compressed by:

removing the content length indicator from the response;

compressing data in the received IP datagrams of the response before the last IP datagram of the response is received; and encoding the compressed data into data chunks to generate an encoded compressed response for transmission to the first endpoint, the encoded compressed response comprising an indication that the encoding has been applied.

11. The method of claim 10, wherein the data compression policy is based on at least one of:

a record of the first endpoint having included in a request to the second endpoint an indication that the first endpoint is capable of uncompressing compressed IP datagrams to extract data therein;

stored profile data of the first endpoint indicating one of that the first endpoint is capable of uncompressing compressed IP datagrams to extract data therein and that originally uncompressed IP datagrams, that are to be transmitted to said first endpoint, can be compressed; and information defining types of data which the received IP datagrams are permitted to contain.

12. The method of claim 10, wherein IP datagrams of a HTTP/1.1 response are routed and compressed, wherein the response comprises a Content-Length header; and wherein data in the received IP datagrams is compressed by:

removing the Content-Length header from the response;

executing a HTTP-compliant compression algorithm to compress data in the received IP datagrams before the last IP datagram of the response is received; and applying chunked transfer encoding to the compressed data to generate a transfer encoded response comprising a Transfer-Encoding header for transmission to the first endpoint.

13. The method of claim 10, wherein the policy enforcing point is a Policy and Charging Enforcing Function (PCEF) node of a Policy and Charging Control, PCC) architecture telecommunications network.

14. The method of claim 9, wherein IP datagrams of a HTTP/1.1 response are routed and compressed, wherein the response comprises a Content-Length header; and wherein data in the received IP datagrams is compressed by:

removing the Content-Length header from the response;

executing a HTTP-compliant compression algorithm to compress data in the received IP datagrams before the last IP datagram of the response is received; and applying chunked transfer encoding to the compressed data to generate a transfer encoded response comprising a Transfer-Encoding header for transmission to the first endpoint.

15. The method of claim 14, wherein the data compression policy is based on at least one of:

a record of the first endpoint having included in a request to the second endpoint an indication that the first endpoint is capable of uncompressing compressed IP datagrams to extract data therein;

stored profile data of the first endpoint indicating one of that the first endpoint is capable of uncompressing compressed IP datagrams to extract data therein and that originally uncompressed IP datagrams, that are to be transmitted to said first endpoint, can be compressed; and information defining types of data which the received IP datagrams are permitted to contain.

16. The method of claim 14, wherein the policy enforcing point is a Policy and Charging Enforcing Function (PCEF) node of a Policy and Charging Control (PCC) architecture telecommunications network.

17. The method of claim 9, wherein the data compression policy is based on at least one of:

a record of the first endpoint having included in a request to the second endpoint an indication that the first endpoint is capable of uncompressing compressed IP datagrams to extract data therein;

stored profile data of the first endpoint indicating one of that the first endpoint is capable of uncompressing compressed IP datagrams to extract data therein and that originally uncompressed IP datagrams, that are to be transmitted to said first endpoint, can be compressed; and information defining types of data which the received IP datagrams are permitted to contain.

18. The method of claim 17, wherein the policy enforcing point is a Policy and Charging Enforcing Function (PCEF) node of a Policy and Charging Control (PCC) architecture telecommunications network.

19. The method of claim 9, wherein the policy enforcing point is a Policy and Charging Enforcing Function (PCEF) node of a Policy and Charging Control (PCC) architecture telecommunications network.

20. A non-transitory computer-readable storage medium storing computer program instructions for routing by a policy enforcing point, Internet Protocol (IP) datagrams in a two-way communication between a first endpoint in a telecommunications network and a second endpoint in the telecommunications network and compressing, in accordance with a data compression policy, IP datagrams of a response transmitted by the second endpoint to the first endpoint, each IP datagram comprising a sequence of bytes of data and a header defining a sequence number of the first byte of data in the IP datagram, the response being of a layer 7 protocol that supports compression, a layer level being an Open Systems Interconnection (OSI) layer in an OSI Reference Model, when executed by a processor, causes the processor to:

determine whether IP datagrams sent by the second endpoint are uncompressed but can be compressed in accordance with the data compression policy by inspecting, in at least one of the received IP datagrams, control information of the layer 7 protocol which is located beyond an IP 5 tuple in the IP datagram;

compress data in at least one of the received IP datagrams in response to it being determined that the received IP datagrams are uncompressed but can be compressed, thereby generating compressed IP datagrams for transmission to the first endpoint;

modify the headers in the compressed IP datagrams to take into account a reduction in the number of bytes in one or more preceding IP datagrams caused by compression of the data therein so as to ensure a continuity of said sequence numbers between adjacent compressed IP datagrams in the response transmitted by the second endpoint to the first endpoint;

transmit the compressed IP datagrams to the first endpoint and receiving therefrom acknowledgements of receipt of the compressed IP datagrams;

generate, in response to receipt of said acknowledgements, acknowledgments of receipt of the corresponding uncompressed IP datagrams for transmission to the second endpoint; and transmit the acknowledgments of receipt of the corresponding uncompressed IP datagrams to the second endpoint.

\* \* \* \* \*

UNITED STATES PATENT AND TRADEMARK OFFICE
CERTIFICATE OF CORRECTION

| | | |
|---|---|---|
| PATENT NO. | : 8,966,123 B2 | |
| APPLICATION NO. | : 14/239845 | |
| DATED | : February 24, 2015 | |
| INVENTOR(S) | : Gochi Garcia | |

It is certified that error appears in the above-identified patent and that said Letters Patent is hereby corrected as shown below:

In the Specification

In Column 1, Lines 6-7, delete "IF datagrams" and insert -- IP datagrams --, therefor.

In Column 1, Line 8, delete "IF datagrams" and insert -- IP datagrams --, therefor.

In Column 1, Line 22, delete "QoS)." and insert -- (QoS). --, therefor.

In Column 1, Line 28, delete "UE" and insert -- UE 20 --, therefor.

In Column 2, Line 24, delete "GE" and insert -- UE --, therefor.

In Column 2, Line 32, delete ""grip"" and insert -- "gzip" --, therefor.

In Column 2, Line 33, delete "grip," and insert -- gzip, --, therefor.

In Column 2, Line 36, delete ""grip"" and insert -- "gzip" --, therefor.

In Column 2, Line 37, delete "grip;" and insert -- gzip; --, therefor.

In Column 2, Line 59, delete ""Hypertext" and insert -- ("Hypertext --, therefor.

In Column 7, Lines 39-40, delete "comprising" and insert -- comprising a --, therefor.

In Column 7, Line 41, delete "(PEP) 100" and insert -- (PEP) 200 --, therefor.

In Column 8, Line 36, delete "module 210)" and insert -- module 230) --, therefor.

In Column 9, Line 22, delete "PEP" and insert -- PDP --, therefor.

Signed and Sealed this
Twenty-ninth Day of September, 2015

Michelle K. Lee
*Director of the United States Patent and Trademark Office*

CERTIFICATE OF CORRECTION (continued)
U.S. Pat. No. 8,966,123 B2

In Column 9, Lines 25-26, delete "store 640" and insert -- store 630 --, therefor.

In Column 13, Line 17, delete "terminal 400." and insert -- terminal 300. --, therefor.

In Column 14, Line 47, delete "agrupation" and insert -- aggrupation --, therefor.

In Column 17, Line 42, delete "PREF 2000" and insert -- PCEF 2000 --, therefor.

In Column 18, Line 23, delete "successful it" and insert -- successful in --, therefor.

In Column 18, Lines 30-31, delete "processor 620" and insert -- processor 610 --, therefor.

In Column 18, Line 33, delete "store 640." and insert -- store 630. --, therefor.

In the Claims

In Column 22, Line 47, in Claim 13, delete "Control, PCC)" and insert -- Control (PCC) --, therefor.